（12）United States Patent
Yamamoto (10) Patent No.: US 8,155,690 B2
(45) Date of Patent: *Apr. 10, 2012

(54) TRANSMISSION POWER TARGET VALUE VARIABLE CONTROL APPARATUS AND METHOD AND MOBILE COMMUNICATION TERMINAL

(75) Inventor: Kouji Yamamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/024,031

(22) Filed: Feb. 9, 2011

(65) Prior Publication Data

US 2011/0130166 A1  Jun. 2, 2011

Related U.S. Application Data

(63) Continuation of application No. 11/794,758, filed as application No. PCT/JP2006/301749 on Feb. 2, 2006, now Pat. No. 7,899,482.

(30) Foreign Application Priority Data

Feb. 2, 2005  (JP) ................................. 2005-025788

(51) Int. Cl.
H04B 7/00  (2006.01)

(52) U.S. Cl. .... 455/522; 455/69; 455/67.11; 455/456.6; 455/115.1; 455/135; 370/332

(58) Field of Classification Search .................. 455/522, 455/69, 68, 115.1, 506, 70, 226, 453, 446, 455/562, 127, 572, 552, 553, 135, 67, 67.16, 41.2, 114.3, 127.1, 127.3, 126, 435.1, 550.1, 456.6, 67.11, 422.1; 370/311, 342, 328, 335, 332, 515, 329, 474, 336; 375/227, 260, 150, 222

See application file for complete search history.

(56) References Cited

U.S. PATENT DOCUMENTS 5,396,660 A  3/1995 Cannon
(Continued)

FOREIGN PATENT DOCUMENTS

CN  1294469 (A)  5/2001
(Continued)

Primary Examiner — Tan Trinh
(74) Attorney, Agent, or Firm — Foley & Lardner LLP (57) ABSTRACT

A T-SIR generation unit (106a) generates, on the basis of an actual reception quality (205) in a mobile communication terminal, a target value T-SIR to be used to control transmission power of a base station from the mobile communication terminal. When the mobile communication terminal exists in the service area of a predetermined specific communication carrier, a T-SIR correction unit (106b) adds a correction value K to the T-SIR generated by the T-SIR generation unit (106a). Even when a reception SIR abruptly deteriorates in a communication carrier with a strong reception field and a low BLER, it does not drop below the SIR limit value of the mobile communication terminal. Hence, the terminal can receive the signal from the base station and continue a service such as speech communication. When a long-term BLER measurement result is used instead of a BER, stable transmission power control can be done normally.

12 Claims, 6 Drawing Sheets

| U.S. PATENT DOCUMENTS | | | |
|---|---|---|---|
| 5,999,829 A | 12/1999 | Chun et al. | |
| 6,434,124 B1 | 8/2002 | Rege | |
| 6,463,264 B1 * | 10/2002 | Obara | 455/127.2 |
| 6,580,919 B1 | 6/2003 | Saito | |
| 7,139,537 B2 * | 11/2006 | Nakayama | 455/127.1 |
| 7,187,942 B2 | 3/2007 | Hosokawa | |
| 2004/0157633 A1 * | 8/2004 | Ogura | 455/522 |
| 2004/0180686 A1 * | 9/2004 | Nakayama | 455/522 |
| 2008/0096576 A1 | 4/2008 | Brueck et al. | |

| FOREIGN PATENT DOCUMENTS | | |
|---|---|---|
| EP | 1215926 (A1) | 6/2002 |
| JP | 2000-505976 | 5/2000 |
| JP | 2000-333231 | 11/2000 |
| JP | 2003-032184 | 1/2003 |
| JP | 2004-193896 | 7/2004 |
| JP | 2004-200824 | 7/2004 |
| WO | WO 00/33478 (A1) | 6/2000 |
| WO | WO 00/65748 (A1) | 11/2000 |

* cited by examiner

TRANSMISSION POWER TARGET VALUE VARIABLE CONTROL APPARATUS AND METHOD AND MOBILE COMMUNICATION TERMINAL

CROSS-REFERENCE TO RELATED PATENT APPLICATIONS

This application is a continuation of application Ser. No. 11/794,758, filed Jul. 5, 2007, now pending, which is the National Stage of Application No. PCT/JP2006/301749 filed on Feb. 2, 2006, which is based upon and claims the benefit of priority from Japanese Patent Application No. 2005-025788, filed Feb. 2, 2005, the entire contents of all of which are incorporated herein by reference. This application claims only subject matter disclosed in the parent application and therefore presents no new matter.

BACKGROUND OF THE INVENTION

1. Technical Field

The present invention relates to a transmission power target value variable control apparatus and a method thereof and, more particularly, to a target value variable control scheme of variably controlling a target value for transmission power control in a radio channel between a mobile communication terminal and a base station in accordance with an actual reception quality.

2. Background Art

A W-CDMA (Wideband-Code Division Multiple Access) communication scheme has already been developed and come into service as a mobile communication means of third generation. The transmission power control scheme of the W-CDMA communication system includes inner loop control and outer loop control.

In inner loop control, an increase/decrease of the power of a base station from which a portable terminal directly receives a radio wave is controlled in a short period. More specifically, a T-SIR (Target SIR (Signal to Interference Ratio)) is used as a control target value. The T-SIR is compared with a reception SIR measured from a reception signal in the portable terminal. If the reception SIR is lower than the T-SIR, a request to raise the transmission power is issued to the base station. If the reception SIR is higher than the T-SIR, a request to reduce the transmission power is issued to the base station.

In outer loop control, an appropriate T-SIR to be used as a target value of inner loop control is determined on the basis of the long-tei in average of BLERs (BLock Error Rates). More specifically, a required reception quality (Target BLER (T-BLER)) is obtained from a base station. If a BLER measured in a portable terminal is higher than the T-BLER, the T-S IR is raised. If the measured BLER is lower than the T-BLER, the T-SIR is reduced.

Conventional outer loop control will be described in more detail with reference to FIG. 8. A despreading unit 1101 despreads a reception signal and sends the generated signal to a Rake reception unit 1102. The Rake reception unit 1102 Rake-receives and demodulates the signal and sends it to a long section quality measuring unit 1103. The long section quality measuring unit 1103 calculates the BLER of the demodulated signal for a predetermined period and sends the calculation result, i.e., a measured BLER 1203 to a comparison determination unit 1105.

A T-BLER 1104 holds a T-BLER that is a required reception quality obtained from a signal from the base station. The T-BLER 1104 sends a T-BLER 1204 as a required reception quality to the comparison determination unit 1105. The comparison determination unit 1105 compares the measured BLER 1203 calculated by the long section quality measuring unit 1103 with the T-BLER 1204 and sends a comparison result 1205 to a T-SIR generation unit 1106. The T-SIR generation unit 1106 calculates a T-SIR 1206 from the comparison result 1205 and sends it to the inner loop control side (not shown).

In this example, the long-term average of BLERs is used as a reception quality in outer loop control. Reference 1 (Japanese Patent Laid-Open No. 2003-32184) proposes a technique using a BER (Bit Error Rate) as a reception quality.

SUMMARY OF THE INVENTION

Disclosure of Invention

Problems to be Solved by the Invention

Problems of the conventional outer loop control described with reference to FIG. 8 will be explained. If the reception field from a base station is strong, and the BLER is low because of the channel design of a communication carrier (telecommunications carrier), the following problems arise. In outer loop control, when the reception field is strong, and the BLER is low, the T-SIR is continuously reduced to the lower limit value. Assume that the reception SIR abruptly deteriorates due to interference from another base station or terminal. The outer loop control is going to raise the T-SIR but cannot follow the abrupt degradation of the reception SIR because the control uses the long-term average of BLERs. The reception SIR drops below the limit value of the portable terminal before the T-S IR rises. Consequently, the portable terminal cannot receive the signal from the base station. If the user is using the portable terminal for, e.g., a call, the service is interrupted.

Figure 9:
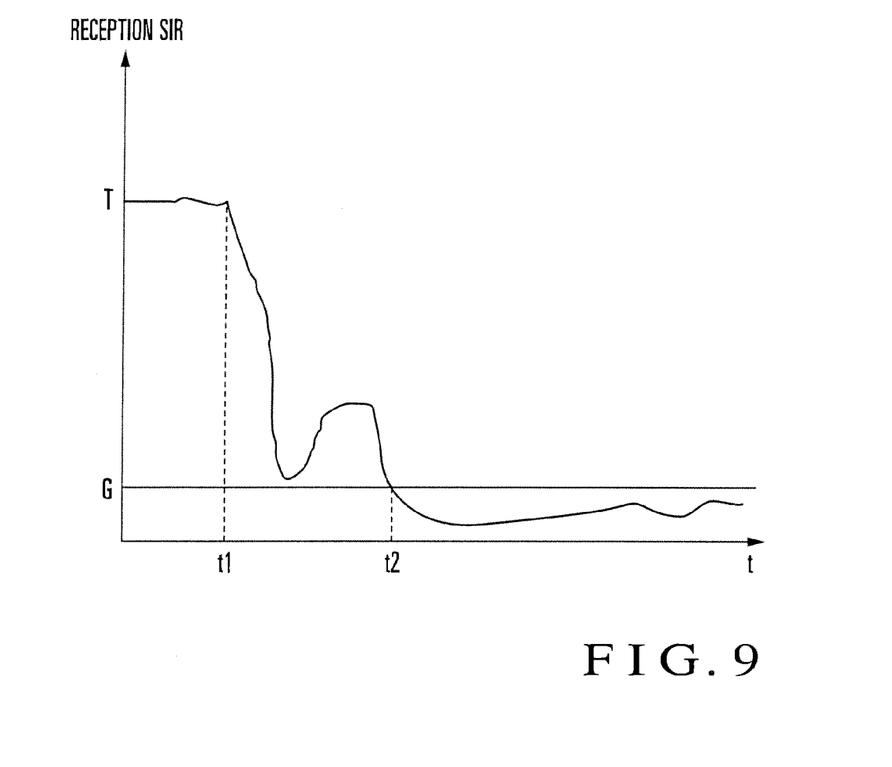
FIG. 9 is a graph for explaining the problems of the prior art shown in FIG. 8.

FIG. 9 shows this state. FIG. 9 shows a change in reception SIR with respect to time (t). "T" indicates the above-described lower limit value of T-SIR, and "G" indicates the SIR limit value of the portable terminal. When the T-SIR has the lower limit value T, the BLER abruptly deteriorates at time t1 due to interference from another base station or terminal. From then on, the outer loop cannot follow with the T-SIR control period. From time t2 when the T-SIR drops below the portable terminal limit value G, the portable terminal cannot receive the signal from the base station, and the service is interrupted.

The technique described in reference 1 uses, as a reception quality, a BER in place of the long-term average of BLERs and therefore ensures rapid follow-up. However, if a BER is used in a normal state, the T-SIR exhibits a very vigorous time-rate change. Power control in inner loop control frequently varies, resulting in instability. Additionally, power consumption for transmission power control in the base station or portable terminal enormously increases.

The present invention has been made to solve these problems, and has as its object to prevent service interruption even when a reception. SIR abruptly deteriorates in a place where the reception field from a base station is strong, and the reception quality is high.

It is another object of the present invention to execute stable transmission power control normally.

Means of Solution to the Problems

In order to achieve the above objects, according to the present invention, there is provided a transmission power target value variable control apparatus characterized by comprising target value generation means for generating, on the basis of an actual reception quality in a mobile communication terminal, a target value to be used to control transmission power of a base station from the mobile communication terminal, and target value correction means for adding a correction value to the target value generated by the target value generation means in a predetermined case.

According to the present invention, there is also provided a mobile communication terminal characterized by comprising target value generation means for generating, on the basis of an actual reception quality, a target value to be used to control transmission power of a base station, and target value correction means for adding a correction value to the target value generated by the target value generation means in a predetermined case.

According to the present invention, there is also provided a transmission power target value variable control method characterized by comprising the steps of generating, on the basis of an actual reception quality in a mobile communication terminal, a target value to be used to control transmission power of a base station from the mobile communication terminal, and adding a correction value to the generated target value in a predetermined case.

Effect of the Invention

In the present invention, a target value is corrected by adding a correction value to it. Even when a reception SIR abruptly deteriorates in a communication carrier with a strong reception field and a low BLER, it does not drop below the SIR limit value of the mobile communication terminal. Hence, the terminal can receive the signal from the base station and continue a service such as speech communication.

In the present invention, the actual reception quality is measured on the basis of the number of errors that have occurred in a reception signal in every predetermined time and used for target value generation. Hence, stable transmission power control can be done normally.

DETAILED DESCRIPTION OF THE PREFERRED EMBODIMENTS

Best Mode for Carrying Out the Invention

The embodiments of the present invention will be described below with reference to the accompanying drawings.

Figure 1:
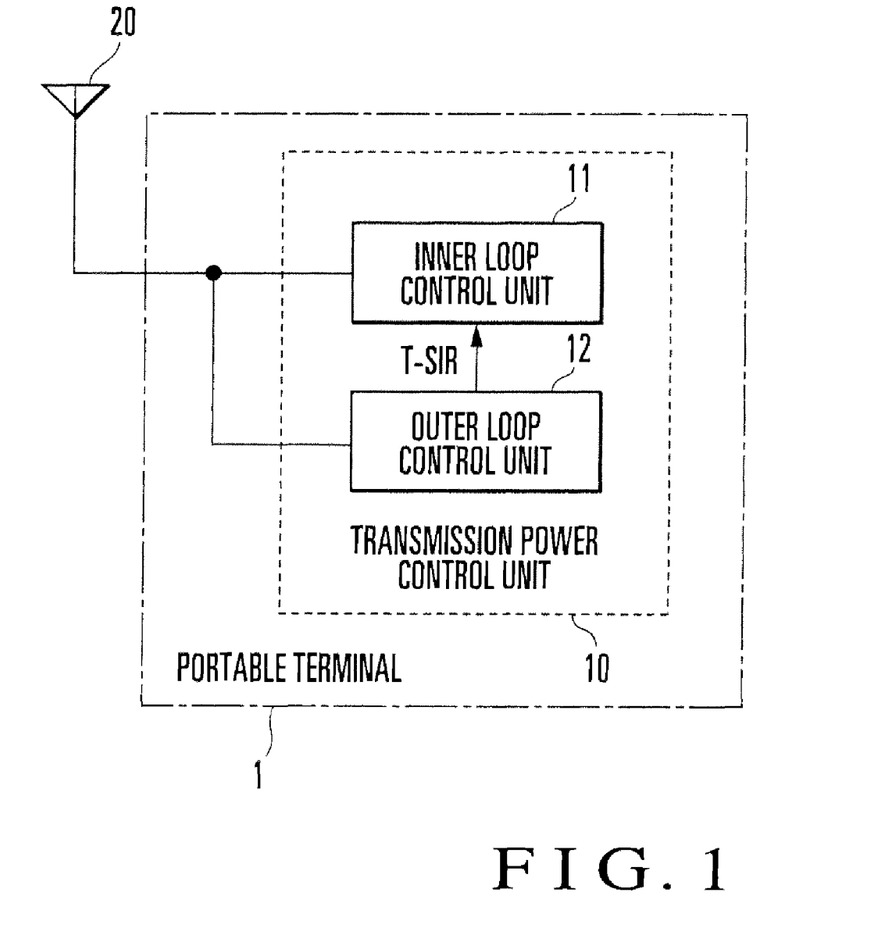
FIG. 1 is a block diagram showing the arrangement of the main part of a portable terminal according to an embodiment of the present invention.

A portable terminal (mobile communication terminal) 1 according to an embodiment of the present invention employs a W-CDMA communication scheme and includes a transmission power control unit 10 and an antenna 20 connected to the transmission power control unit 10, as shown in FIG. 1. The transmission power control unit 10 includes an inner loop control unit 11 and an outer loop control unit (transmission power target value variable control apparatus) 12.

The inner loop control unit 11 controls, in a short period, an increase/decrease of the power of a base station from which the portable terminal 1 directly receives a radio wave. More specifically, a T-SIR is used as a control target value. The T-SIR is compared with a reception SIR measured from a reception signal in the portable terminal 1. If the reception SIR is lower than the T-SIR, a request to raise the transmission power is issued to the base station. If the reception SIR is higher than the T-SIR, a request to reduce the transmission power is issued to the base station.

The outer loop control unit 12 determines, on the basis of the long-term average of BLERs, an appropriate T-SIR to be used as a target value in the inner loop control unit 11. More specifically, a required reception quality T-BLER is obtained from the base station. If a BLER measured in the portable terminal 1 is higher than the T-BLER, the T-SIR is raised. If the measured BLER is lower than the T-BLER, the T-SIR is reduced. Additionally, a correction value is added to the T-SIR in a predetermined case.

Figure 2:
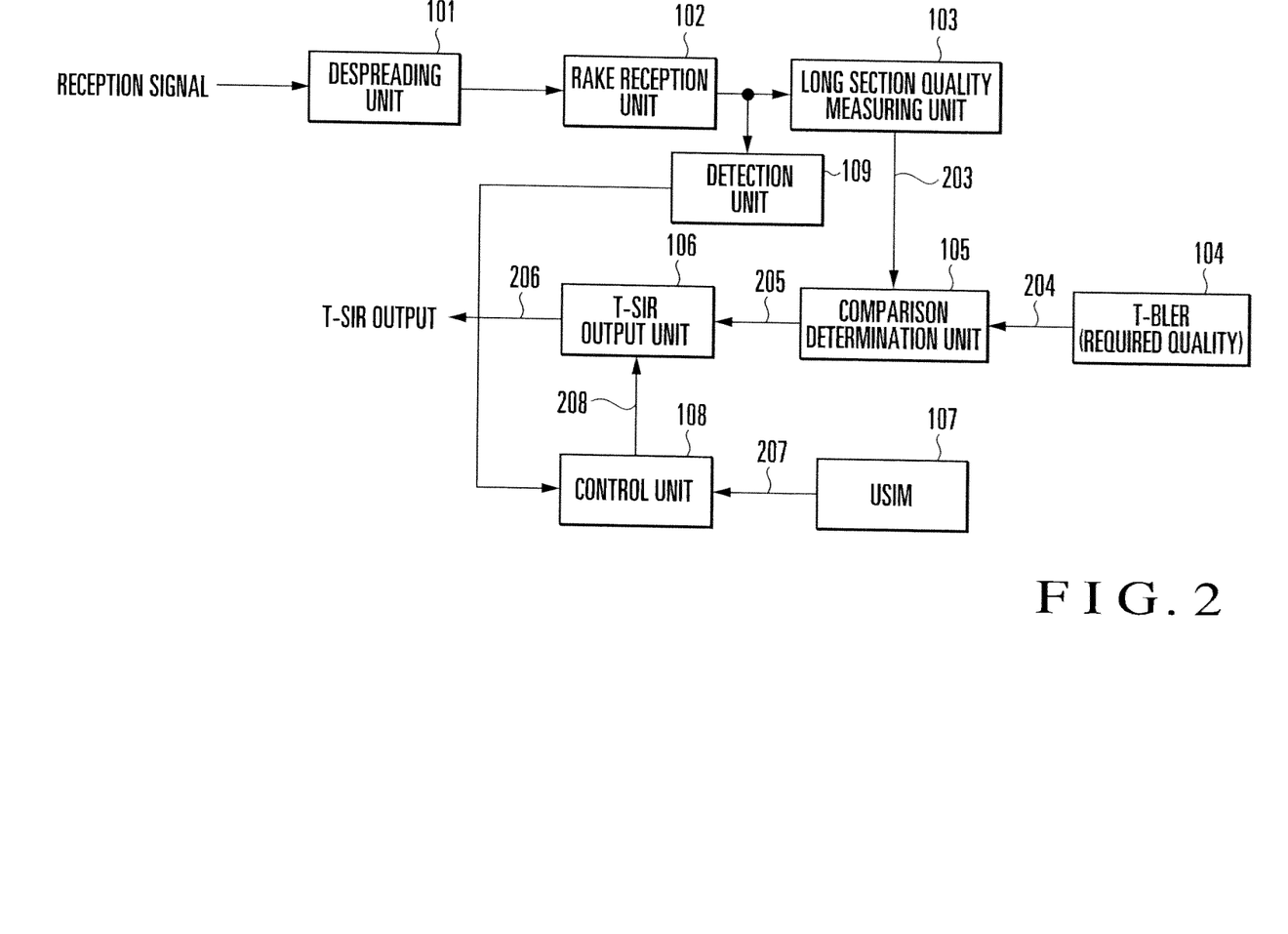
FIG. 2 is a block diagram showing an arrangement of an outer loop control unit in FIG. 1.

As shown in FIG. 2, the outer loop control unit 12 includes a despreading unit 101, Rake reception unit 102, long section quality measuring unit 103, T-BLER holding unit 104, comparison determination unit 105, T-SIR output unit 106, USIM (Universal Subscriber Identify Module) 107, control unit 108, and detection unit 109.

The despreading unit 101 despreads a reception signal and sends the generated signal to the Rake reception unit 102. The Rake reception unit 102 Rake-receives and demodulates the signal and sends it to the long section quality measuring unit 103. The long section quality measuring unit 103 measures the actual reception quality on the basis of the number of errors that have occurred in the demodulated signal in every predetermined time and sends the reception quality to the comparison determination unit 105. More specifically, the long section quality measuring unit 103 calculates the BLER of the demodulated signal for a predetermined time and sends the calculation result, i.e., a measured BLER 203 to the comparison determination unit 105.

The T-BLER holding unit 104 holds a T-BLER that is a required reception quality obtained from a signal from the base station. The T-BLER holding unit 104 sends a T-BLER 204 as a required reception quality to the comparison determination unit 105. The comparison determination unit 105 compares the measured BLER 203 calculated by the long section quality measuring unit 103 with the T-BLER 204 and sends a comparison result 205 to the T-SIR output unit 106.

The USIM 107 is an extended SIM (Subscriber Identify Module) card oriented to third-generation mobile communications. The USIM 107 stores information about a communication carrier, i.e., a communication carrier ID as identification information to specify a communication carrier and supplies a communication carrier ID 207 to the control unit 108. The detection unit 109 detects, from the reception signal, the communication carrier ID (the identifier of the communication carrier) of the service area where the portable terminal 1 currently is camping on (visiting) and supplies it to the control unit 108. The control unit 108 compares the communication carrier ID from the detection unit 109 with the communication carrier ID 207 from the USIM 107. If the communication carrier IDs match, the control unit 108 sends a control signal 208 to the T-SIR output unit 106.

Figure 3:
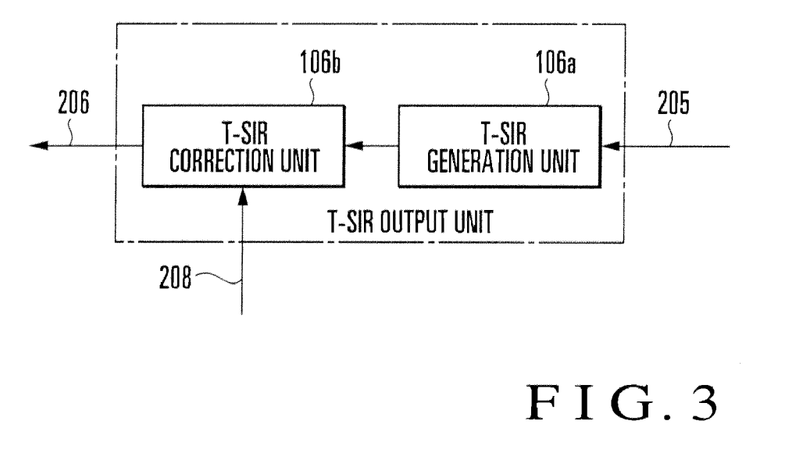
FIG. 3 is a block diagram showing an arrangement of a T-SIR output unit in FIG. 2.

The T-SIR output unit 106 calculates a T-SIR 206 on the basis of the comparison result 205 from the comparison determination unit 105 and the control signal 208 from the control unit 108 and sends the T-SIR 206 to the inner loop control unit 11. The T-SIR output unit 106 includes a T-SIR generation unit (target value generation unit) 106a and a T-SIR correction unit (target value correction unit) 106b, as shown in FIG. 3.

Figure 8:
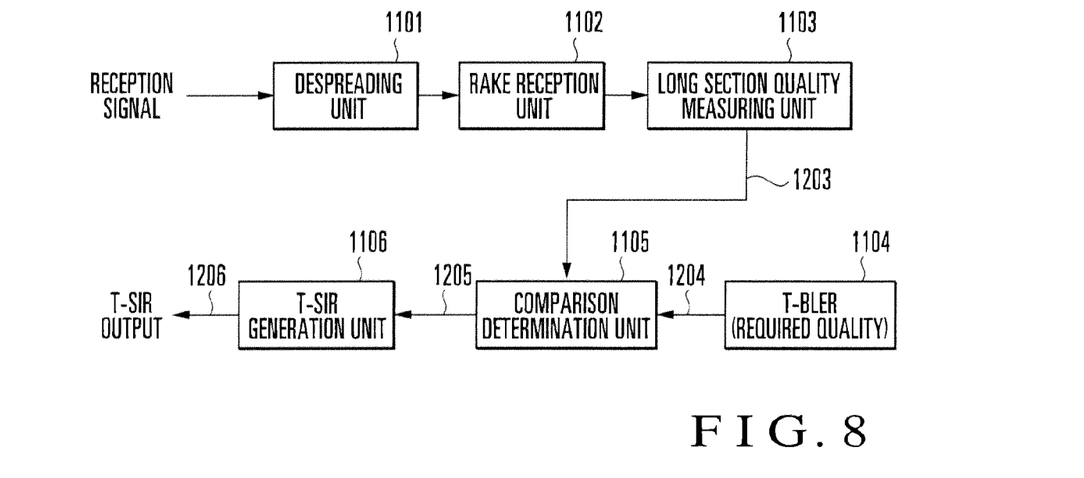
FIG. 8 is a block diagram of a prior art.

The T-SIR generation unit 106a is the same as the conventional T-SIR generation unit 1106 shown in FIG. 8 and generates a T-SIR on the basis of the comparison result 205 from the comparison determination unit 105. That is, the T-S IR generation unit 106a generates a T-SIR in accordance with the actual reception quality in the portable terminal 1.

The T-SIR correction unit 106b adds a correction value K to the T-SIR generated by the T-SIR generation unit 106a in response to the control signal 208 from the control unit 108 and sends the sum as the T-SIR 206 in inner loop control. In this arrangement, when the portable terminal 1 is camping on in the service area of a predetermined specific communication carrier, the T-SIR correction unit 106b adds the correction value K to the T-S IR generated by the T-SIR generation unit 106a.

Figure 4:
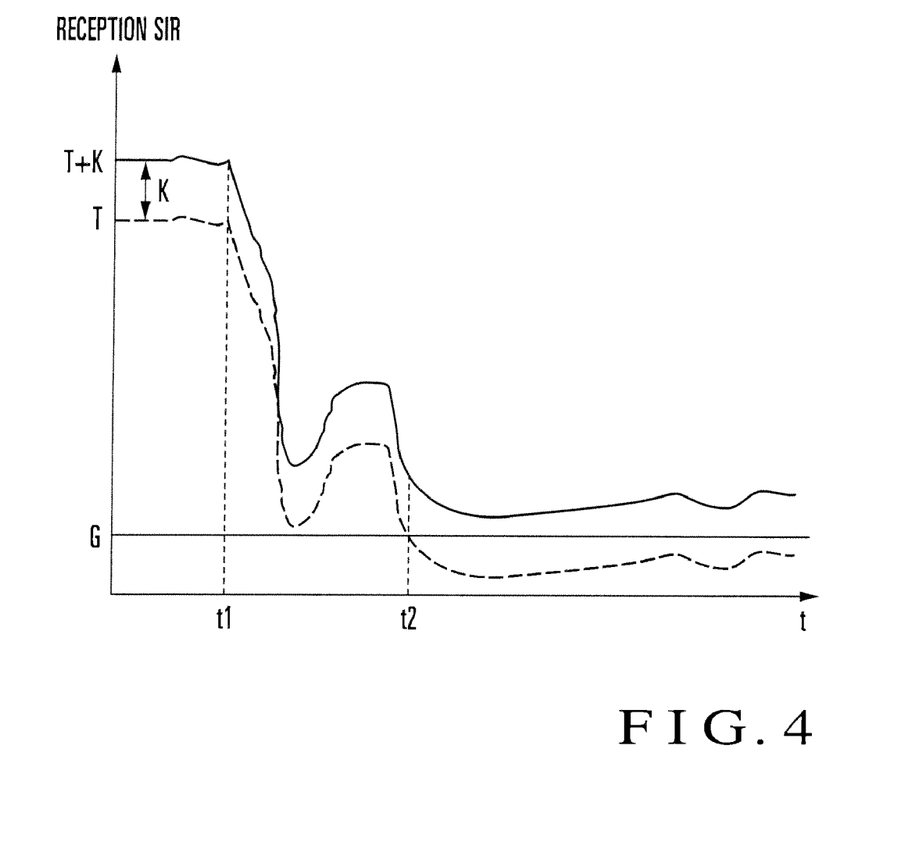
FIG. 4 is a graph for explaining the operation of the outer loop control unit in FIG. 2.

The operation of this embodiment will be described next with reference to FIG. 4. Referring to FIG. 4, "T" indicates the lower limit value of T-SIR, and "G" indicates the SIR limit value of the portable terminal 1, as in FIG. 9. In a communication carrier with a strong reception field and a low reception BLER, the T-SIR drops to T as a result of long section reception quality measurement. When the portable terminal 1 is camping on in the service area of a specific communication carrier, the control unit 108 sends the control signal 208 to the T-SIR output unit 106 on the basis of the communication carrier ID 207 from the USIM 107. The T-SIR output unit 106 adds the predetermined value K to the T-SIR and outputs a value (T+K) as the T-SIR 206.

Even when the reception SIR abruptly deteriorates from time t1, it does not drop below the SIR limit value G of the portable terminal 1 from time t2 because the T-SIR has increased by the predetermined value K. Hence, the portable terminal 1 can continuously receive the signal from the base station so that service interruption such as disconnection of speech communication can be prevented.

Figure 5:
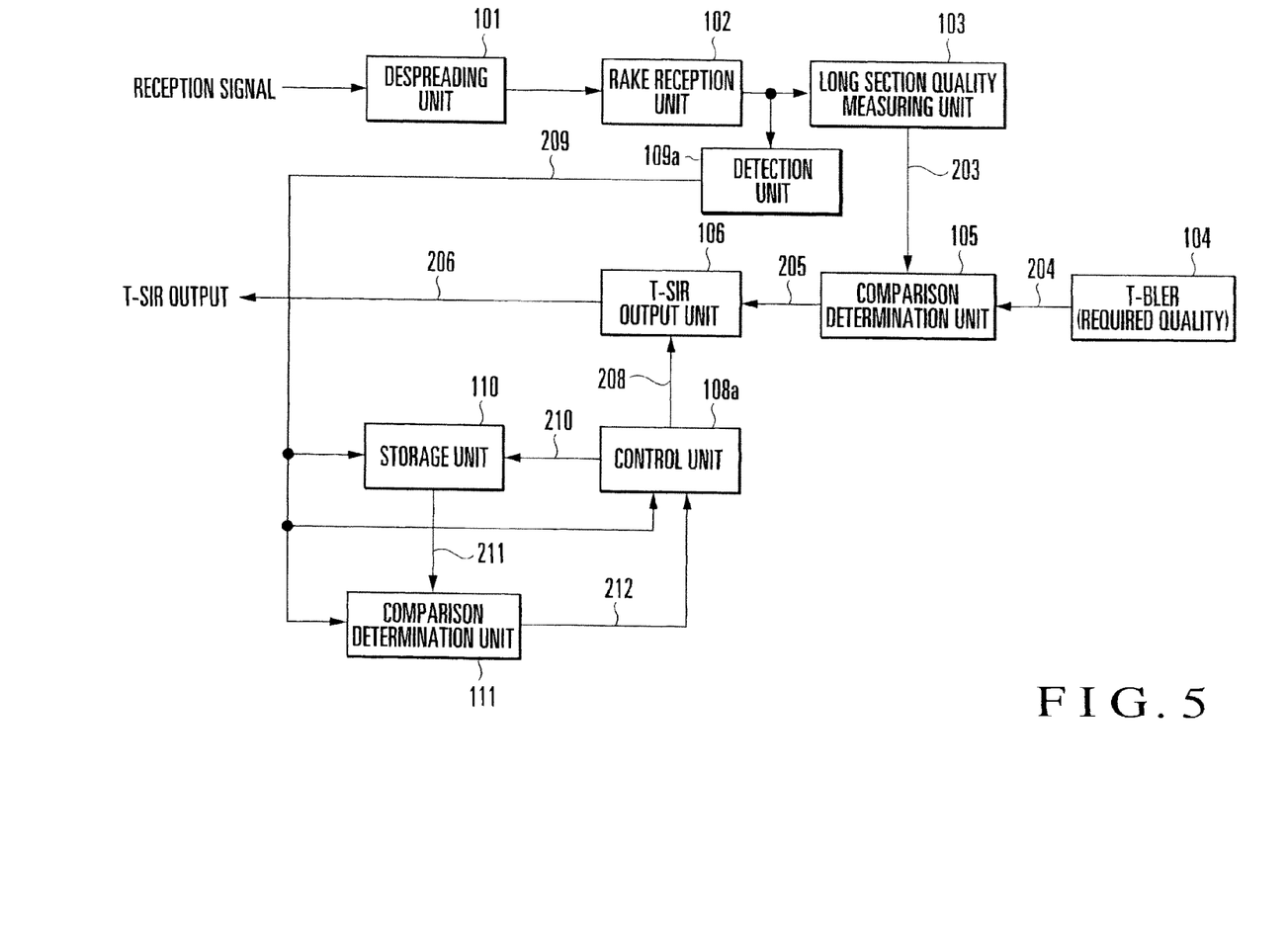
FIG. 5 is a block diagram showing an arrangement of the outer loop control unit of a portable terminal according to another embodiment of the present invention.

Another embodiment of the present invention will be described next with reference to FIG. 5. The same reference numerals as in FIG. 2 denote the same constituent elements in FIG. 5. In a portable terminal according to this embodiment, the USIM 107 of the outer loop control unit in FIG. 2 is omitted, and a storage unit 110 and a comparison determination unit 111 are added. Additionally, a control unit 108a and a detection unit 109a replace the control unit 108 and the detection unit 109 in FIG. 2, respectively.

Figure 6:
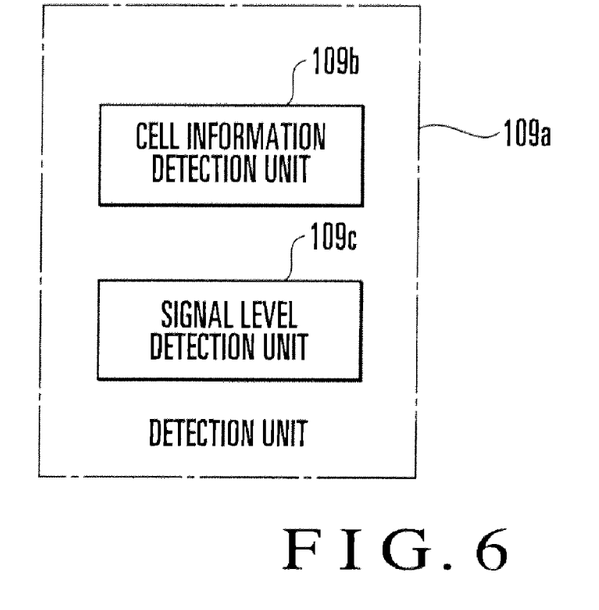
FIG. 6 is a block diagram showing an arrangement of a detection unit in FIG. 5.

As shown in FIG. 6, the detection unit 109a includes a cell information detection unit 109b and a signal level detection unit 109c. The cell information detection unit 109h detects a base station ID from a demodulated signal as current cell information. The signal level detection unit 109c detects the signal level of the demodulated signal. In this embodiment, the signal level detection unit 109c detects a decrease in level of the demodulated signal. The base station ID detected by the cell information detection unit 109b and the decrease in level of the demodulated signal detected by the signal level detection unit 109c are supplied to the control unit 108a, storage unit 110, and comparison determination unit 111 as a detection signal 209.

Figure 7:
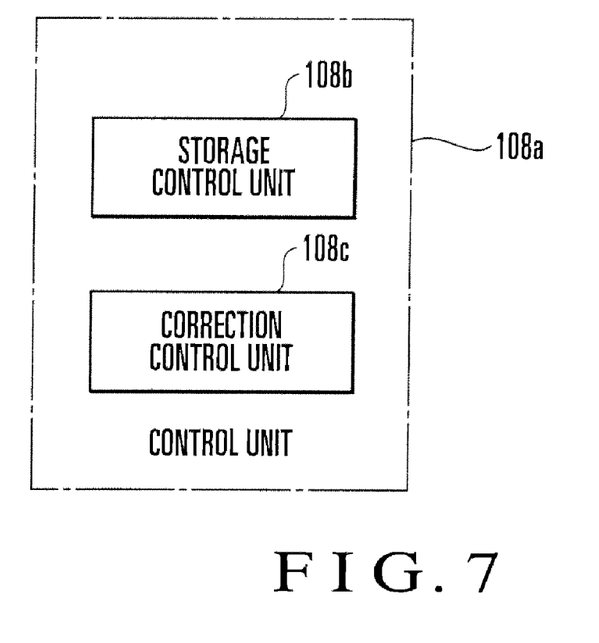
FIG. 7 is a block diagram showing an arrangement of a control unit in FIG. 5.

The control unit 108a includes a storage control unit 108b and a correction control unit 108c, as shown in FIG. 7. The storage control unit 108b determines on the basis of the level decrease signal from the signal level detection unit 109c whether the reception SIR has abruptly deteriorated from a preset reference value. Upon determining that the reception SIR has abruptly deteriorated, the storage control unit 108b instructs to store, in the storage unit 110, the base station ID detected by the cell information detection unit 109b and currently being received. The storage unit 110 sequentially stores the log of base station IDs corresponding to the timings of abrupt deterioration of reception SIR.

The comparison determination unit 111 compares base station IDs 211 stored in the storage unit 110 with the base station ID currently being received. If the base station IDs 211 include the base station ID currently being received, the comparison determination unit 111 sends a coincidence signal 212 to the control unit 108. In response to the coincidence signal 212, the correction control unit 108c of the control unit 108 sends a control signal 208 to a T-SIR output unit 106. The T-SIR output unit 106 outputs the sum of the T-SIR and a predetermined value K, i.e., a value (T+K) as a T-SIR 206.

As described above, in this embodiment, a base station which has exhibited abrupt deterioration of reception SIR under conditions of a strong reception field and a low reception BLER is stored. In the next utilization of this base station, the predetermined value K is added to the T-SIR. Hence, in this embodiment, even when no communication carrier information is obtained from the USIM 107, the same effect as in the above-described embodiment can be obtained in the cell of the base station where the reception SIR has abruptly deteriorated formerly.

What is claimed is:

1. A transmission power target value variable control apparatus comprising:
    a target value generation unit that generates, on the basis of an actual reception quality in a mobile communication terminal, a target value to be used to control transmission power of a base station from the mobile communication terminal;
    a target value correction unit that adds a correction value to the target value generated by said target value generation unit in a predetermined case; and
    a storage unit that stores, as a log, an identifier of a base station with which said mobile communication terminal is in communication at a time when a reception level has abruptly deteriorated beyond a predetermined value,
    wherein said target value correction unit adds the correction value to the target value when an identifier of a base station with which said mobile communication terminal is in communication is contained in the identifier of said base station stored in said storage unit.

2. A transmission power target value variable control apparatus according to claim 1, wherein when the mobile communication terminal exists in a service area of a predetermined specific communication carrier, said target value correction unit adds the correction value to the target value.

3. A transmission power target value variable control apparatus according to claim 1, further comprising:
    an identifier of a base station detection unit that detects the current identifier of a base station from a reception signal;
    a signal level detection unit that detects a signal level of the reception signal;
    a storage control unit that detects deterioration of the signal level from a detection result of said signal level detection unit and stores, in said storage unit, the identifier of a base station detected by said identifier of a base station detection unit; and a correction control unit that outputs a control signal to said target value correction unit when the current identifier of a base station detected by said identifier of a base station detection unit is contained in the cell information identifier of a base station stored in said storage unit, wherein said target value correction unit adds the correction value to the target value upon receiving the control signal.

4. A transmission power target value variable control apparatus according to claim 3, further comprising a quality measuring unit that measures the actual reception quality on the basis of the number of errors that have occurred in the reception signal in every predetermined time and outputs the reception quality to said target value generation unit.

5. A mobile communication terminal comprising:

a target value generation unit that generates, on the basis of an actual reception quality, a target value to be used to control transmission power of a base station;

a target value correction unit that adds a correction value to the target value generated by said target value generation unit in a predetermined case; and a storage unit that stores, as a log, an identifier of a base station with which said mobile communication terminal is in communication at a time when a reception level has abruptly deteriorated beyond a predetermined value, wherein said target value correction unit adds the correction value to the target value when an identifier of a base station with which said mobile communication terminal is in communication is contained in the identifier of said base station stored in said storage unit.

6. A mobile communication terminal according to claim 5, wherein when the mobile communication terminal exists in a service area of a predetermined specific communication carrier, said target value correction unit adds the correction value to the target value.

7. A mobile communication terminal according to claim 5, further comprising a quality measuring unit that measures the actual reception quality on the basis of the number of errors that have occurred in a reception signal in every predetermined time and outputs the reception quality to said target value generation unit.

8. A mobile communication terminal according to claim 5, wherein the mobile communication terminal employs a W-CDMA communication scheme.

9. A transmission power target value variable control method comprising the steps of:

generating, on the basis of an actual reception quality in a mobile communication terminal, a target value to be used to control transmission power of a base station from the mobile communication terminal;

adding a correction value to the generated target value in a predetermined case; and, storing an identifier of a base station with which said mobile communication terminal is in communication in storage means as a log at a time when a reception level has abruptly deteriorated beyond a predetermined value, wherein in the adding step, the correction value is added to the target value when an identifier of a base station with which said mobile communication terminal is in communication is contained in the identifier of said base station stored in the storage means.

10. A transmission power target value variable control method according to claim 9, wherein in the adding step, when the mobile communication terminal exists in a service area of a predetermined specific communication carrier, the correction value is added to the target value.

11. A transmission power target value variable control method according to claim 9, further comprising the step of measuring the actual reception quality on the basis of the number of errors that have occurred in a reception signal in every predetermined time.

12. A transmission power target value variable control method according to claim 9, wherein the method is used in a W-CDMA communication scheme.

* * * * *

UNITED STATES PATENT AND TRADEMARK OFFICE
CERTIFICATE OF CORRECTION

PATENT NO. : 8,155,690 B2
APPLICATION NO. : 13/024031
DATED : April 10, 2012
INVENTOR(S) : Kouji Yamamoto Page 1 of 1

It is certified that error appears in the above-identified patent and that said Letters Patent is hereby corrected as shown below:

IN THE CLAIMS:

Column 7, Claim 3, line 7: Please delete "cell information".

Signed and Sealed this
Third Day of July, 2012

David J. Kappos
*Director of the United States Patent and Trademark Office*